United States Patent Office 2,761,866
Patented Sept. 4, 1956

2,761,866
3-PYRIDINE SULFINIC ACID AND PROCESS

Moses Wolf Goldberg, Upper Montclair, and Sidney Teitel, Nutley, N. J., assignors to Hoffmann-La Roche Inc., Nutley, N. J., a corporation of New Jersey No Drawing. Application July 7, 1954,
Serial No. 441,949

4 Claims. (Cl. 260—294.8)

This invention relates to 3-pyridinesulfinic acid and derivatives thereof. More particularly, the invention relates to 3-pyridinesulfinic acid and aryl, aralkyl, pyridyl, and pyridylalkyl derivatives thereof as well as the salts of these pyridyl sulfones.

The compounds may be represented by the following formula

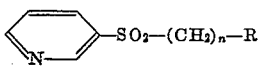

wherein $n$ is an integer from 0 to 2 and R represents hydrogen, monocyclic aryl or pyridyl. The monocyclic aryl groups represented by R include phenyl and substituted phenyl radicals such as nitrophenyl, aminophenyl, chlorophenyl, acylaminophenyl, and the like. Salts of the compounds defined by the above formula, e. g. those formed with the nitrogen atom of the pyridyl group, are particularly within the scope of this invention. Such salts include acid addition salts, such as the hydrohalides, sulfates, toluenesulfonates, etc., and quaternary salts, such as the alkyl halide, alkenyl halide, aryl halide, aralkyl halide, nuclearly substituted aralkyl halide and phenacyl halide quaternary salts.

3-pyridinesulfinic acid is produced by condensing 3-pyridinesulfonyl chloride with hydrazine to produce 3-pyridinesulfonic acid hydrazide and reacting the latter with carbonyl compounds having three or more carbon atoms, e. g. aldehydes and ketones. Carbonyl compounds with three or more carbon atoms which react with 3-pyridinesulfonic acid hydrazide to produce 3-pyridinesulfinic acid include acetone, methyl ethyl ketone, methyl isobutyl ketone, acetonyl acetone, cyclohexanone, acetophenone, β-ionone, propionaldehyde, isobutyraldehyde, and benzaldehyde. The 3-pyridinesulfonic acid hydrazide may be isolated and purified, if desired, before reacting it with the carbonyl compound.

Pyridyl sulfones which are derivatives of 3-pyridinesulfinic acid can be prepared by condensing a salt thereof, e. g. an alkali metal salt, with a halide, such as an active aryl halide, an aralkyl halide, a pyridyl halide, a pyridylalkyl halide, or nuclearly substituted derivatives of such compounds, in an organic solvent such as ethanol, dimethylformamide, methyl ethyl ketone, acetonitrile, etc.

Alternatively, 3-pyridinesulfinic acid may be reacted with a compound containing a double bond attached to a monocyclic aryl or a pyridyl group, such as a vinylpyridine, preferably in a liquid reaction medium, such as water, or an organic solvent or mixtures thereof.

Specific examples of compounds which may be reacted with 3-pyridinesulfinic acid or metal salts thereof include 4-vinylpyridine, 2-vinyl-5-ethyl-pyridine, styrene, p-nitrochlorobenzene, p-nitrobenzylbromide, p-nitrophenethylbromide and 4-chloromethylpyridine.

Salts of the novel pyridyl sulfones, for example acid addition salts, are produced by reacting the base with a strong acid such as a mineral acid, e. g. hydrochloric acid. Quaternary salts are synthesized by reacting the base with a quaternizing agent in an organic solvent for the base. Suitable quaternizing agents include lower alkyl halides, such as methyl bromide, propyl bromide and butyl bromide, or the corresponding chlorides or iodides; alkenyl halides such as allyl bromide; aryl halides containing an activated halogen such as p-nitrochlorobenzene; aralkyl halides such as benzyl bromide or benzyl chloride; and phenacyl halides. The quaternizing agents may be nuclearly substituted, e. g. p-nitrobenzyl bromide. Solvents for the quaternizing reaction include acetone, acetonitrile, dimethylformamide, nitromethane, benzene, etc.

Aminophenyl sulfones of the above mentioned general formula may be produced by reducing the corresponding nitro-compounds, for example, with Raney nickel and hydrogen. Quaternary salts of these aminophenyl sulfones can be obtained, for example, by acetylation of the amino group, followed by quaternization and deacetylation.

3-pyridinesulfinic acid is useful as an antimetabolite, possessing antiniacin activity. The pyridyl sulfones derived from 3-pyridinesulfinic acid have utility as anthelmintics, e. g. they are active against worms of the family of Oxyuridae.

Example 1

To a stirred solution of 25 grams (0.46 mol) of 100% hydrazine hydrate in 150 ml. of ethanol were slowly added 30 grams (0.14 mol) of 3-pyridinesulfonyl chloride hydrochloride (finely powdered), so that the reaction temperature did not exceed 50° C. The mixture was stirred vigorously while cooling to room temperature, and the crystals of hydrazine monohydrochloride that formed were filtered off. Benzene was added to the filtrate and the solution was concentrated at atmospheric pressure, to remove the water-benzene-alcohol ternary mixture. A second crop of hydrazine monohydrochloride was then filtered off and the filtrate was concentrated to 50 ml. The solution was rendered turbid by the addition of acetonitrile. After storage at 4° C. overnight, the pale yellow crystals of 3-pyridinesulfonic acid hydrazide which had formed were filtered off, washed with acetonitrile and dried, M. P. 100–102° C.

Calculated for $C_5H_7N_3O_2S$: C, 34.67; H, 4.08. Found: C, 34.40; H, 4.61.

To a stirred solution of 50 grams (0.29 mol) of 3-pyridinesulfonic acid hydrazide in 100 ml. of water was slowly added 15 ml. of acetone so that the reaction temperature did not exceed 50° C. The resulting deeply yellow colored solution was diluted with 1,600 ml. of acetone, whereupon crystals formed immediately. The mixture was stored at 4° C. for 3 hours, filtered, and the yellow crystals of 3-pyridinesulfinic acid were washed with acetone and air dried, M. P. 161–163° C.

Calculated for $C_5H_5NO_2S$: C, 41.94; H, 3.52; N, 9.79. Found: C, 41.91; H, 3.48; N, 9.52.

Example 2

To a solution of 210 ml. of 85% hydrazine hydrate in 800 ml. of ethanol was slowly added, while stirring, 194 grams (0.97 mol) of 3-pyridinesulfonyl chloride hydrochloride (finely powdered), so that the reaction temperature did not exceed 30° C. The mixture was vigorously stirred at room temperature for 6 hours. The crystals of hydrazine monohydrochloride that had formed were filtered off. The filtrate was diluted with an equal volume of benzene and was concentrated at atmospheric pressure to 150 ml. A second crop of hydrazine monohydrochloride was then filtered off. To the filtrate was now slowly added 300 ml. of acetone, so that the temperature did not exceed 40° C. The resulting yellow solution was then diluted with 2 liters of acetone, cooled, and the crystals of 3-pyridinesulfinic acid that formed were filtered off.

Example 3

The sodium salt of 3-pyridinesulfinic acid was prepared by neutralizing an aqueous solution of 3-pyridinesulfinic acid with sodium hydroxide and evaporating the resulting colorless solution, to give the non-hygroscopic amorphous sodium salt.

16.6 grams (0.1 mol) of the dry sodium salt of 3-pyridinesulfinic acid and 18 grams (0.11 mol) of p-nitrochlorobenzene were dissolved in 115 ml. of dimethylformamide and the solution was refluxed for 15 hours. The reaction mixture was cooled, poured slowly into 800 ml. of water, and the crystals that formed were filtered off, washed with water and air dried. Upon recrystallization from 80% ethanol the p-nitrophenyl 3-pyridylsulfone melted at 172–174° C.

Calculated for $C_{11}H_8N_2O_4S$: C, 49.98; H, 3.05. Found: C, 50.15; H, 2.81.

Example 4

To 10 grams (37.8 m. mols) of p-nitrophenyl 3-pyridylsulfone, suspended in 100 ml. acetonitrile, were added 150 ml. of ice-cold acetone containing 45% methyl bromide (by weight). The mixture was heated in a sealed tube at 100° C. for 8 hours. After cooling, the amorphous reaction product was filtered off and crystallized from water-methanol-ether. The 1-methyl-3-(p-nitrophenylsulfonyl)pyridinium bromide hemihydrate melted at 294–296° C. with decomposition.

Calculated for $C_{12}H_{11}BrN_2O_4S \cdot \tfrac{1}{2}H_2O$: C, 39.15; H, 3.29. Found: C, 39.21; H, 3.49.

Example 5

To 9.2 grams (0.4 mol) of sodium, dissolved in 1 liter of absolute ethanol, were added a finely powdered mixture of 28.7 grams (0.2 mol) of 3-pyridinesulfinic acid and 39.0 grams (0.2 mol) of 4-bromopyridine hydrochloride. The mixture was stirred and refluxed for 20 hours, the insolubles were filtered off while still hot, the filtrate was concentrated to 150 ml. and the resulting solution was rendered turbid by the addition of ether. After storage at 4° C. overnight, the crystals that had formed were filtered off, washed with cold ethanol-ether (1:1) to remove color, and then dried. The 3,4'-sulfonyldipyridine was recrystallized from ethanol-ether, M. P. 124–125° C.

Calculated for $C_{10}H_8N_2O_2S$ ———— C, 54.54; H, 3.66
Found ———————————————— C, 54.27; H, 3.32
                                54.34;   3.26

Example 6

8 grams (36.4 m.mols) of 3,4'-sulfonyldipyridine were dissolved in 200 ml. of ice-cold acetone containing 40% methyl bromide (by weight). The solution, in a tightly stoppered flask, was allowed to warm slowly to room temperature, then stored overnight. The pale yellow crystals that had formed were filtered off, washed with acetone and dried. The methobromide of 3,4'-sulfonyldipyridine hemihydrate melted at 141–143° C. with decomposition, upon recrystallization from 95% ethanol-ether.

Calculated for $C_{11}H_{11}BrN_2O_2S \cdot \tfrac{1}{2}H_2O$: C, 40.75; H, 3.73. Found: C, 40.81; H, 3.76.

Example 7

To 1.15 grams (0.05 mol) of sodium, dissolved in 100 ml. of absolute ethanol, were added 7.2 grams (0.05 mol) of 3-pyridinesulfinic acid and 10.8 grams (0.05 mol) of p-nitrobenzyl bromide. The resulting solution, after 5 minutes of refluxing, became turbid. The mixture was stirred and refluxed for 15 hours, filtered hot, and the crystalline material was washed on the filter thoroughly with water and air dried. The p-nitrobenzyl 3-pyridylsulfone was recrystallized from acetonitrile, M. P. 204–205° C. with decomposition.

Calculated for $C_{12}H_{10}N_2O_4S$: C, 51.79; H, 3.62. Found: C, 51.84; H, 3.68.

Example 8

To an ice cold suspension of 10 grams (0.036 mol) of p-nitrobenzyl 3-pyridyl sulfone in 170 ml. of acetonitrile were added 170 ml. of acetone containing 40% (by weight) methyl bromide. The mixture was heated in a sealed tube at 100° for 8 hours, cooled, and the pale yellow crystals filtered off, washed with acetone and dried. The methobromide of p-nitrobenzyl 3-pyridyl sulfone, M. P. 227–228° C. with decomposition, was recrystallized from water-acetone.

Calculated for $C_{13}H_{13}BrN_2O_4S$: C, 41.84; H, 3.51. Found: C, 41.68; H, 3.15.

Example 9

To a solution of 8 grams (0.029 mol) of p-nitrobenzyl 3-pyridyl sulfone in 250 ml. of acetonitrile were added 10 grams (0.82 mol) of n-propyl bromide. The solution was heated in a sealed tube at 125° C. for 8 hours. The solution was then cooled and the crystals that had formed were filtered off, washed with acetonitrile and dried. The 3-(p-nitrobenzylsulfonyl)-1-propylpyridinium bromide was recrystallized from methanol-acetonitrile-ether and melted at 217–218° C. with decomposition.

Calculated for $C_{15}H_{17}BrN_2O_4S$: C, 44.90; H, 4.27. Found: C, 45.17; H, 4.20.

Example 10

To a suspension of 10 grams (0.036 mol) of p-nitrobenzyl 3-pyridyl sulfone in 115 ml. of acetonitrile were added 10 ml. of n-butyl bromide. The suspension was heated in a sealed tube at 125° C. for 8 hours. The resulting highly colored solution was cooled and the volatiles were distilled off. The residual solid, 3-(p-nitrobenzylsulfonyl)-1-butylpyridinium bromide, was crystallized from methanol-ether, M. P. 208–209° C. with decomposition.

Calculated for $C_{16}H_{19}BrN_2O_4S$: C, 46.28; H, 4.61. Found: C, 46.24; H, 4.95.

Example 11

A mixture of 12.2 grams (0.044 mol) of p-nitrobenzyl 3-pyridyl sulfone and 34 grams (0.44 mol) of allyl chloride in 100 ml. of acetonitrile was heated in a sealed tube at 100° C. for 8 hours. The reaction mixture was concentrated to a volume of 50 ml. and cooled. The crystals which had formed were filtered off, washed with acetonitrile and dried. The product, 3-(p-nitrobenzylsulfonyl)-1-allylpyridinium chloride, was recrystallized from a mixture of acetonitrile (containing a trace of water) and ether, M. P. 185–186° C. with decomposition.

Calculated for $C_{15}H_{15}ClN_2O_4S$: C, 50.77; H, 4.26. Found: C, 50.91; H, 4.50.

Example 12

5 grams (0.029 mol) of benzyl bromide were added to 8 grams (0.029 mol) of p-nitrobenzyl 3-pyridyl sulfone dissolved in 150 ml. of acetonitrile. After ½ hour at reflux temperature, crystals formed. The mixture was stirred and refluxed for another 6 hours and cooled. The crystals were filtered off, washed with acetonitrile and dried. The 3-(p-nitrobenzylsulfonyl)-1-benzyl-pyridinium bromide was recrystallized from ethanol-acetonitrile-ether, M. P. 208–210° C. with decomposition.

Calculated for $C_{19}H_{17}BrN_2O_4S$: C, 50.79; H, 3.81. Found: C, 51.24; H, 4.08.

Example 13

3-(p-nitrobenzylsulfonyl)-1-(p-nitrobenzyl)-pyridinium bromide, M. P. 137–139° C. with decomposition, was prepared by reacting 8 grams (0.029 mol) of p-nitrobenzyl 3-pyridyl sulfone with 6.3 grams (0.029 mol) of p-nitrobenzyl bromide according to the procedure described in Example 12 and recrystallizing the product from methanol-acetonitrile-ether.

Calculated for $C_{19}H_{16}BrN_3O_6S$: C, 46.16; H, 4.13.
Found: C, 46.32; H, 4.00.

Example 14

16.6 grams (0.1 mol) of the dry sodium salt of 3-pyridinesulfinic acid and 17.2 grams (0.1 mol) of m-nitrobenzyl chloride dissolved in 200 ml. of absolute ethanol were refluxed for 12 hours, then cooled. The reaction product was filtered off and extracted in a Soxhlet apparatus with methanol. The methanol extract was cooled and the crystals that had formed were filtered off and dried. The m-nitrobenzyl 3-pyridyl sulfone, recrystallized from acetonitrile-ether, melted at 158–160° C. with decomposition.

Calculated for $C_{12}H_{10}N_2O_4S$: C, 51.79; H, 3.62.
Found: C, 51.75; H, 3.35.

3 - (m - nitrobenzylsulfonyl) - 1 - methylpyridinium bromide, M. P. 225–226° C. with decomposition, was prepared by treating 8 grams (0.029 mol) of m-nitrobenzyl 3-pyridyl sulfone, dissolved in 100 ml. of acetonitrile, with 100 ml. of a 40% acetone solution of methyl bromide, according to the procedure described in Example 8. The product was recrystallized from 90% ethanol-ether.

Calculated for $C_{13}H_{13}BrN_2O_4S$: C, 41.84; H, 3.51.
Found: C, 42.04; H, 3.66.

Example 15 p-Nitrophenethyl 3-pyridyl sulfone, M. P. 171–173° C., was prepared from 23 grams (0.1 mol) of p-nitrophenethyl bromide according to the procedure described in the first paragraph of Example 14. The product was recrystallized from acetonitrile-ether.

Calculated for $C_{13}H_{12}N_2O_4S$: C, 53.43; H, 4.14.
Found: C, 53.74; H, 3.98.

By employing the method described in Example 9, 10 grams (0.29 mol) of p-nitrophenethyl 3-pyridyl sulfone and 10 grams (0.82 mol) of n-propyl bromide were reacted to produce 3-(p-nitrophenethylsulfonyl)-1-propylpyridinium bromide, M. P. 172–174° C. The product was recrystallized from acetonitrile-ether.

Calculated for $C_{16}H_{19}BrN_2O_4S$: C, 46.29; H, 4.61.
Found: C, 46.41; H, 4.47.

Example 16

Two teaspoons of Raney nickel catalyst were added to a suspension of 41.8 grams (0.15 mol) of p-nitrobenzyl 3-pyridyl sulfone in 700 ml. of dimethylformamide. The mixture was hydrogenated at 80° C. and 1,000 p. s. i. The catalyst was filtered off, the solvent was distilled off, and the residual syrup was dissolved in 300 ml. of boiling ethanol. Upon cooling, the crystals which had formed were filtered off and dried. The p-aminobenzyl 3-pyridyl sulfone, M. P. 166–168° C., was recrystallized from ethanol.

Calculated for $C_{12}H_{12}N_2O_2S$: C, 58.04; H, 4.87.
Found: C, 58.21; H, 4.96.

Example 17

A mixture of 15 grams (0.06 mol) of p-aminobenzyl 3-pyridyl sulfone and 250 ml. of isopropenyl acetate were stirred and refluxed for 15 hours. The volatiles were distilled off from the reaction mixture and the residual solid was crystallized from acetonitrile-ethanol-ether. The p-acetamidobenzyl 3-pyridyl sulfone melted at 181–183° C. with decomposition.

Calculated for $C_{14}H_{14}N_2O_3S$: C, 57.93; H, 4.86.
Found: C, 58.05; H, 5.05.

To an ice cold suspension of 11.6 grams (0.04 mol) of p-acetamidobenzyl 3-pyridyl sulfone in 100 ml. of acetonitrile were added 50 ml. of acetone containing 40% methyl bromide by weight. The mixture was heated in a sealed tube at 100° C. for 8 hours. The mixture was cooled and the volatiles were then distilled off. The residue was crystallized from water-ethanol. The methobromide of p-acetamidobenzyl 3-pyridyl sulfone melted at 225–226° C. with decomposition.

Calculated for $C_{16}H_{17}BrN_2O_3S$: C, 46.75; H, 4.45.
Found: C, 46.43; H, 4.68.

Example 18

According to the procedure described in Example 7, 17.8 grams (0.125 mol) of 3-pyridinesulfinic acid were reacted with 20 grams (0.125 mol) of p-chlorobenzyl chloride. Upon recrystallization from ethanol-ether, the p-chlorobenzyl 3-pyridyl sulfone melted at 163–164° C.

Calculated for $C_{12}H_{10}ClNO_2S$ ----- C, 53.84; H, 3.77
Found ------------------------- C, 54.35; H, 3.96
                                   54.39;    3.84

According to the procedure described in Example 8, 9 grams (0.034 mol) of p-chlorobenzyl 3-pyridyl sulfone were treated with 170 ml. of a 40% acetone solution of methyl bromide. The methobromide of p-chlorobenzyl 3-pyridyl sulfone was recrystallized from methanol-ether and melted at 225–227° C. with decomposition.

Calculated for $C_{13}H_{13}BrClNO_2S$: C, 43.05; H, 3.61.
Found: C, 43.29; H, 3.69.

Example 19

4-chloromethylpyridine hydrochloride was prepared by treating 34 grams of 4-hydroxymethylpyridine hydrochloride with 50 grams of phosphorus pentachloride (portionwise). When the heat of reaction subsided, 20 ml. of chloroform were added. The mixture was refluxed for 3 hours. The volatiles were then distilled off and the residue crystallized from 50 ml. of ethanol.

16.8 grams (0.12 mol) of 4-chloromethylpyridine hydrochloride were dissolved in 35 ml. of ice water, the solution was made alkaline with sodium carbonate and then quickly extracted with three 15 ml. portions of benzene. The benzene extracts were washed with water and dried with sodium sulfate. The dried benzene extracts were then added to 16.6 grams (0.1 mol) of the sodium salt of 3-pyridinesulfinic acid, dissolved in 100 ml. of dimethylformamide. The mixture was stirred on the steam bath for 12 hours and then cooled. The yellow reaction product, 3-pyridyl 4-pyridylmethyl sulfone, was filtered off, washed with water and dried. The product was recrystallized from acetonitrile-ether and melted at 150–152° C.

Calculated for $C_{11}H_{10}N_2O_2S$: C, 56.28; H, 4.30.
Found: C, 56.67; H, 4.24.

9 grams (0.038 mol) of 3-pyridyl 4-pyridylmethyl sulfone were treated with 200 ml. of ice cold acetone containing 40% (by weight) of methyl bromide, according to the procedure described in Example 6. The methobromide of 3-pyridyl 4-pyridylmethyl sulfone, after recrystallization from methanol-ethanol-ether, melted at 199–201° C. with decomposition.

Calculated for $C_{12}H_{13}BrN_2O_2S$: C, 43.76; H, 3.98.
Found: C, 43.61; H, 4.29.

Example 20

To 36 grams (0.25 mol) of 3-pyridinesulfinic acid, dissolved in 400 ml. of water, were added 25.2 grams (0.24 mol) of 4-vinylpyridine. The solution was stirred and heated on a steam bath for 7 hours. The volatiles were removed at steam temperature and water vacuumed. A residual oil, 2-(4-pyridyl)ethyl 3-pyridyl sulfone, remained. The oil was dissolved in acetone to give a total volume of 120 ml. [40 ml. equivalent to 0.08 mol of 2-(4-pyridyl)ethyl 3-pyridyl sulfone].

40 ml. of the above acetone solution were diluted with 150 ml. of ethanol and dry hydrogen chloride gas was bubbled in to pH 3. The solution was evaporated to dryness and the residual gum was crystallized from methanol-ethanol-ether. The dihydrochloride of 2-(4-pyridyl)ethyl 3-pyridyl sulfone melted at 170–172° C. with decomposition.

Calculated for $C_{12}H_{12}N_2O_2S \cdot 2HCl$: C, 44.86; H, 4.39.
Found: C, 44.84; H, 4.46.

Example 21

The dimethobromide of 2-(4-pyridyl)ethyl 3-pyridyl sulfone was prepared by treating 40 ml. of the acetone solution of 2-(4-pyridyl)ethyl 3-pyridyl sulfone, described in Example 20 with 100 ml. of acetone containing 45% (by weight) of methyl bromide, according to the procedure described in Example 6. Upon recrystallization from methanol-acetone, the dimethobromide melted at 202–203° C. with decomposition.

Calculated for $C_{14}H_{18}Br_2N_2O_2S$: C, 38.27; H, 4.14. Found: C, 38.54; H, 4.49.

Example 22

27.4 grams (0.16 mol) of benzyl bromide dissolved in 50 ml. of methanol were added to 40 ml. of an acetone solution containing the equivalent of 0.08 mol of 2-(4-pyridyl)ethyl 3-pyridyl sulfone (described in Example 20). The solution was refluxed for 8 hours. The volatiles were distilled off in vacuo and the residual gum was crystallized from methanol-acetonitrile-ether. The dibenzyl bromide of 2-(4-pyridyl)ethyl 3-pyridyl sulfone dihydrate melted at 183–185° C. with decomposition.

Calculated for $C_{26}H_{26}Br_2N_2O_2S\cdot 2H_2O$: C, 49.89; H, 4.83. Found: C, 50.03; H, 4.55.

Example 23

2-(2-pyridyl)ethyl 3-pyridyl sulfone was prepared by reacting 27 grams of 3-pyridinesulfinic acid with 18.9 grams of 2-vinylpyridine in the same manner as described in the first paragraph of Example 20. Each 50 ml. of the finally obtained acetone solution was equivalent to 0.06 mol of 2-(2-pyridyl)ethyl 3-pyridyl sulfone.

In the same manner as described in the second paragraph of Example 20, 50 ml. of the above acetone solution was treated with ethanolic hydrogen chloride to produce the dihydrochloride of 2-(2-pyridyl)ethyl 3-pyridyl sulfone, M. P. 169–171° C. with decomposition. Crystallization was effected from methanol-ethanol-ether.

Calculated for $C_{12}H_{12}N_2O_2S\cdot 2HCl$: C, 44.86; H, 4.39. Found: C, 45.28; H, 4.42.

Example 24

50 ml. of an acetone solution containing 0.06 mol of 2-(2-pyridyl)ethyl 3-pyridyl sulfone, described in Example 23, were treated with 100 ml. of acetone containing 45% (by weight) of methyl bromide, according to the procedure of Example 6. The dimethobromide of 2-(2-pyridyl)ethyl 3-pyridyl sulfone thus obtained melted at 196–197° C. with decomposition. The product was crystallized from methanol-ethanol-ether.

Calculated for $C_{14}H_{18}Br_2N_2O_2S$: C, 38.37; H, 4.14. Found: C, 38.65; H, 3.93.

Example 25

To 50 ml. of an acetone solution containing 0.06 mol of 2-(2-pyridyl)ethyl 3-pyridyl sulfone, described in Example 23, were added 25.9 grams (0.12 mol) of p-nitrobenzyl bromide in 100 ml. of acetonitrile. The reaction mixture was refluxed for 8 hours. The resulting solution was cooled and the volatiles were distilled off in vacuo. The p-nitrobenzyl bromide of 2-(2-pyridyl)ethyl 3-pyridyl sulfone hydrobromide, M. P. 178–179° C. with decomposition, was crystallized from a mixture of water (containing a trace of hydrobromic acid) and acetone.

Calculated for $C_{19}H_{18}BrN_3O_4S\cdot HBr$: C, 41.85; H, 3.51. Found: C, 41.82; H, 3.80.

We claim:
1. 3-pyridinesulfinic acid.
2. A process for producing 3-pyridinesulfinic acid which comprises reacting 3-pyridinesulfonic acid hydrazide with a carbonyl compound containing at least three carbon atoms.
3. A process as in claim 2 wherein the carbonyl compound is acetone.
4. A process which comprises condensing 3-pyridinesulfonyl chloride with hydrazine and reacting the condensation product obtained with a carbonyl compound containing at least three carbon atoms.

References Cited in the file of this patent

UNITED STATES PATENTS 2,537,428    Seon et al. _____ Jan. 9, 1951

FOREIGN PATENTS 940,088    France _____ Dec. 2, 1948

OTHER REFERENCES

Curtius et al.: Beilstein (Handbuch, 4th ed.), vol. 11, p. 52 (1928).
King et al.: Chem. Abst., vol. 33, col. 6314 (1939).
Dewing et al.: Chem. Abst., vol. 38, p. 4103 (1942).
Backer et al.: Chem. Abst., vol. 40, col. 3414 (1946).
Burton et al.: Chem. Abst., vol. 41, col. 3461 (1947).